United States Patent
Ketheesan et al.

(10) Patent No.: US 9,686,675 B2
(45) Date of Patent: Jun. 20, 2017

(54) SYSTEMS, METHODS AND DEVICES FOR DERIVING SUBSCRIBER AND DEVICE IDENTIFIERS IN A COMMUNICATION NETWORK

(71) Applicant: Tektronix, Inc., Beaverton, OR (US)

(72) Inventors: Kanapathipillai Ketheesan, San Francisco, CA (US); Kiran B. Suresh, Freemont, CA (US)

(73) Assignee: NETSCOUT SYSTEMS TEXAS, LLC, Plano, TX (US)

( * ) Notice: Subject to any disclaimer, the term of this patent is extended or adjusted under 35 U.S.C. 154(b) by 32 days.

(21) Appl. No.: 14/672,920

(22) Filed: Mar. 30, 2015

(65) Prior Publication Data
US 2016/0295398 A1 Oct. 6, 2016

(51) Int. Cl.
*H04W 36/00* (2009.01)
*H04W 8/26* (2009.01)
*H04W 12/04* (2009.01)
*H04W 8/20* (2009.01)
*H04W 8/02* (2009.01)
*H04W 4/12* (2009.01)
*H04W 12/06* (2009.01)
(Continued)

(52) U.S. Cl.
CPC .............. *H04W 8/26* (2013.01); *H04W 4/12* (2013.01); *H04W 8/02* (2013.01); *H04W 8/205* (2013.01); *H04W 12/04* (2013.01); *H04W 12/06* (2013.01); *H04W 24/08* (2013.01); *H04W 12/02* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2009/0147951 A1* | 6/2009 | Kuo | ...................... | H04W 12/04 380/44 |
| 2011/0142239 A1* | 6/2011 | Suh | ........................ | H04W 12/02 380/270 |

(Continued)

*Primary Examiner* — Brandon Renner
(74) *Attorney, Agent, or Firm* — Locke Lord LLP; Scott D. Wofsy; Christopher J. Capelli

(57) ABSTRACT

A network monitoring node receives one or more data messages regarding User Equipment (UE) from one or more network interfaces for a communication session in the communication network continuously in real-time, determines a subscriber identification (ID) associated with the UE from the one or more data messages regarding the UE, and determines an equipment identification (ID) associated with the UE from the one or more data messages regarding the UE. The network monitoring node further receives a base-key associated with the UE from the one or more data messages regarding the UE, derives a decryption key from the base-key, decrypts a temporary ID associated with the UE from the one or more data messages regarding the UE based on the decryption key, maps the temporary ID with the subscriber ID for the UE, and the subscriber ID with the equipment ID for the UE, and assigns data messages for all further communication sessions to the UE based on the mapping. The Subscriber ID and Equipment ID are preferably assigned to all further communication sessions for that UE. It updates the mapping when changes to the temporary ID or equipment ID occur.

18 Claims, 7 Drawing Sheets

(51) Int. Cl.
*H04W 24/08* (2009.01)
*H04W 88/02* (2009.01)
*H04W 88/08* (2009.01)
*H04W 12/02* (2009.01)

(56) References Cited

U.S. PATENT DOCUMENTS

| | | | |
|---|---|---|---|
| 2012/0039464 A1* | 2/2012 | Xu | H04L 63/205 380/28 |
| 2012/0170510 A1* | 7/2012 | Kim | H04L 5/0053 370/315 |
| 2012/0196570 A1* | 8/2012 | Lindholm | H04W 8/26 455/411 |
| 2012/0224564 A1* | 9/2012 | Paisal | H04N 7/148 370/331 |
| 2014/0198637 A1* | 7/2014 | Shan | H04W 52/243 370/229 |
| 2015/0173111 A1* | 6/2015 | Agarwal | H04W 12/06 370/329 |
| 2015/0373773 A1* | 12/2015 | Ainali | H04W 24/02 455/411 |
| 2016/0127897 A1* | 5/2016 | Lee | H04L 63/06 713/176 |
| 2016/0165431 A1* | 6/2016 | Chandramouli | H04W 36/0022 455/435.2 |

\* cited by examiner

SYSTEMS, METHODS AND DEVICES FOR DERIVING SUBSCRIBER AND DEVICE IDENTIFIERS IN A COMMUNICATION NETWORK

BACKGROUND

1. Field of the Invention

The present disclosure relates to network analytics, and more particularly, to deriving subscriber and device identifiers of User Equipment (UE) in communication networks.

2. Description of the Related Art

Long Term Evolution (LTE) networks generally use 4th generation (4G) wireless technologies and are considered a next evolution for GSM (Global System for Mobile Communications). LTE particularly provides a set of enhancements to the Universal Mobile Telecommunications System (UMTS) mobile standard promulgated by Third Generation Partnership Project (3GPP), and is designed to provide higher data transmission rates while efficiently utilizing the spectrum thereby supporting a multitude of subscribers. LTE is all-IP permitting applications such as real time voice, video, gaming, social networking and location-based services.

LTE networks also provide improved security features that, in part, protect User Equipment (UE) identification from being intercepted. For example, LTE networks use temporary identifiers, instead of actual identifiers for UE, during radio interface transmission between UEs and evolved Node Bs (eNBs).

Despite the desirable intentions of such improved security features (e.g., protecting UE information against unwanted interception, etc.), such LTE security features hinder valuable network analytics such as device analytics, UE tracking, and the like, for network operators. That is, without appropriate identifiers (e.g., subscriber identifiers, equipment identifiers, etc.) to correlate and assign traffic amongst various network nodes to particular calls, sessions, devices, users, etc., overall network analytics, including UE tracking, prove difficult at best.

Some conventional approaches attempt to bypass such security features by soliciting information from certain network nodes (e.g., a Mobile Management Entity node); however, not all MME vendors allow or even support such solicitation.

Accordingly, there exists a need for further improvements to UE mapping, particularly for LTE networks. Preferably, these UE mapping improvements should be applicable to other network technologies and other telecommunication standards that employ these technologies. The present invention provides a solution for these problems.

SUMMARY

The improved subscriber mapping techniques discussed herein particularly employ one or more network monitoring nodes for network interfaces in real time in a communication network—here, a 3GPP LTE network. The network monitoring node (or nodes) monitor authentication messages for User Equipment in a communication network at various network tap points in order to map, in part, temporary UE identifiers (e.g., a Globally Unique Temporary ID (GUTI), etc.) to subscriber identifiers (e.g., an International Mobile Subscriber Identity (IMSI), etc.) and further map the subscriber identifiers to device or equipment identifiers (e.g., an international mobile equipment identity IMEI, etc.). The above described comprehensive mapping techniques obviate the need to solicit information from vendors, including corresponding vendor network nodes, without compromising the improved security features. Further, these mapping techniques correlate UE traffic for calls or sessions and facilitate network analytics, including device analytics and UE tracking.

In accordance with one or more embodiments discussed herein, subscriber mapping techniques (employed by a network monitoring node or nodes) include steps to receive one or more data messages regarding User Equipment (UE) from one or more network interfaces for a communication session in a communication network. It is to be appreciated that network monitoring nodes can substitute the network tap data at the eNB with a data stream from the eNB if supported by the eNB vendor. For example, one or more network monitoring nodes receive data messages between various network nodes at corresponding network taps. In certain embodiments, these network taps are operatively coupled to the network interface between UE and evolved Node Bs (eNBs) (e.g., Uu interfaces), between eNBs and a Mobility Management Entity (MME) node (e.g. S1AP interfaces) and between an MME node and a Home Subscriber Server (HSS) node (e.g., S6a and S13 interfaces). It is to be appreciated the S6a interface preferably provides an IMSI to Kasme mapping and the S13 interface provides a IMSI to IMEI mapping. For the Uu interfaces, messages typically conform to a Radio Resource Control (RRC) protocol, while messages for the S6a and S13 interfaces conform to Diameter protocols.

According to the subscriber mapping techniques, the network monitoring node also determines a subscriber identification (ID) associated with the UE from the one or more data messages regarding the UE. In particular, the subscriber ID includes, for example, an International Mobile Subscriber Identification (IMSI). For example, the network monitoring node can determine the subscriber ID by filtering and parsing Diameter messages.

The network monitoring node further receives a security key or a base-key (e.g., $K_{asme}$ key), which serves as a security key for subsequent message exchanges between the UE and various network nodes in the communication network. The network monitoring node derive other keys from the base key, including a Non-Access Stratum Encryption ($K_{NASenc}$) Key and a Non-Access Stratum Integrity Protection ($K_{NASint}$) Key.

The network monitoring node also determines an equipment identification (ID) associated with the UE from the one or more data messages. For example, the equipment ID can include an International Mobile Equipment Identifier (IMEI). During initial attach procedures, the network monitoring node receives NAS messages within RRC or S1AP messages that are encrypted according to the base-key (or base-key derivatives). The network monitoring node receives such encrypted NAS messages and decrypts them, based on the base-key (or appropriate derivative) to determine the IMEI.

In certain alternative embodiments, the network monitoring node determines the equipment ID associated with the UE from Diameter messages on the S13 interface between the MME node and the HSS node.

The network monitoring node also receives NAS messages within RRC messages that include an encrypted temporary ID for the UE and decrypts the temporary ID (a Globally Unique Temporary Identifier (GUTI) or Short Temporary Mobile Subscriber Identifier (S-TMSI) for subsequent call sessions) associated with the UE based on appropriate keys (e.g., $K_{NASenc}$ key, and $K_{NASint}$ key).

The network monitoring node maps the temporary ID with the subscriber ID for the UE, and further maps the subscriber ID with the equipment ID for the UE. In this fashion, the network monitoring node maps, for 3GPP networks, a GUTI (or S-TMSI) to an IMSI and the IMSI to an IMEI. Data messages for the communication session as well as data messages for subsequent communication sessions are assigned to the UE based on the mapping.

Network analytics can be performed on the data messages and achieve significant network penetration since data messages are mapped or correlated with a particular UE throughout the network. Additionally, using these mapping techniques, UE tracking is also improved.

With respect to subsequent communication sessions, the UE attaches to the network using the temporary ID (e.g., using the GUTI). In certain embodiments, a short form of the GUTI is typically used for radio network (e.g., S-TMSI) communications. In these certain embodiments, the network monitoring node receives the subsequent data messages, including the S-TMSI and constructs the GUTI from the S-TMSI associated with the UE. It is to be appreciated that the GUTI is preferably constructed from S-TMSI such that GUTI=PLMN IDIMMEGIIS-TMSI. To construct a GUTI from the S-TMSI, it is preferable to ascertain the MMEGI (MME Group Id) and the PLMN ID(MCC+MNC) to use. To achieve this, mapping is preferably maintained of the MMEGI and PLMN for each eNB and use that to construct the GUTI from an S-TMSI based on the eNB currently being used by the UE. This mapping can be created from a newly assigned GUTI for a UE being served by that eNB. The network monitoring node additionally maps the S-TMSI and/or GUTI with the IMSI for the UE and also continuously updates the mapping when network events update UE identification.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

A component or a feature that is common to more than one drawing is indicated with the same reference number in each of the drawings.

DESCRIPTION OF EXAMPLE EMBODIMENTS

As discussed above, the 3rd Generation Partnership Project (3GPP) organization specifies the architecture for various mobile cellular networks. The latest mobile Long Term Evolution (LTE) network architecture defined by the 3GPP is called Evolved 3GPP Packet Switched Domain—also known as the Evolved Packet Core (EPC).

Figure 1:
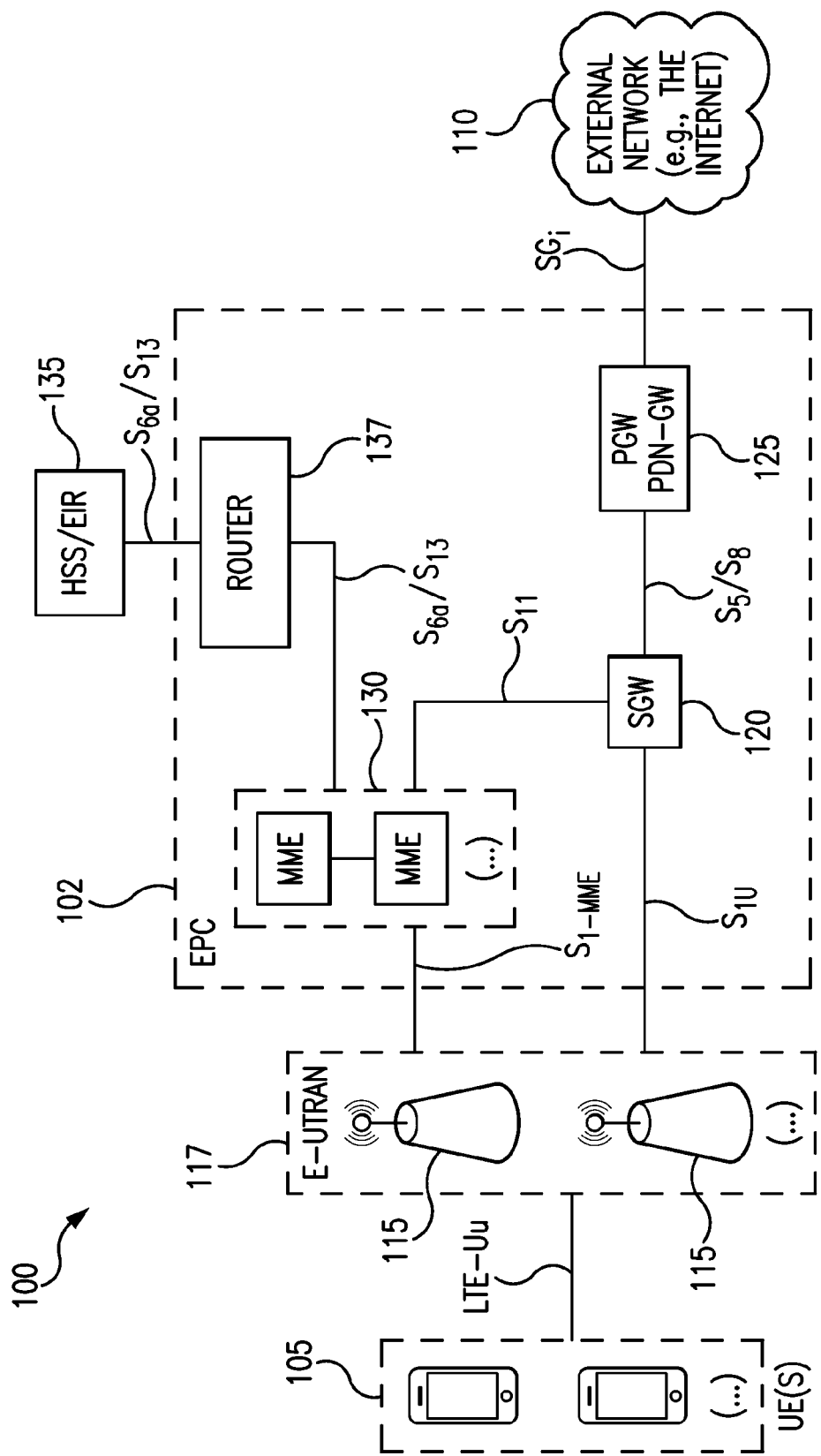
FIG. 1 illustrates an example communication network.
Figure 3:
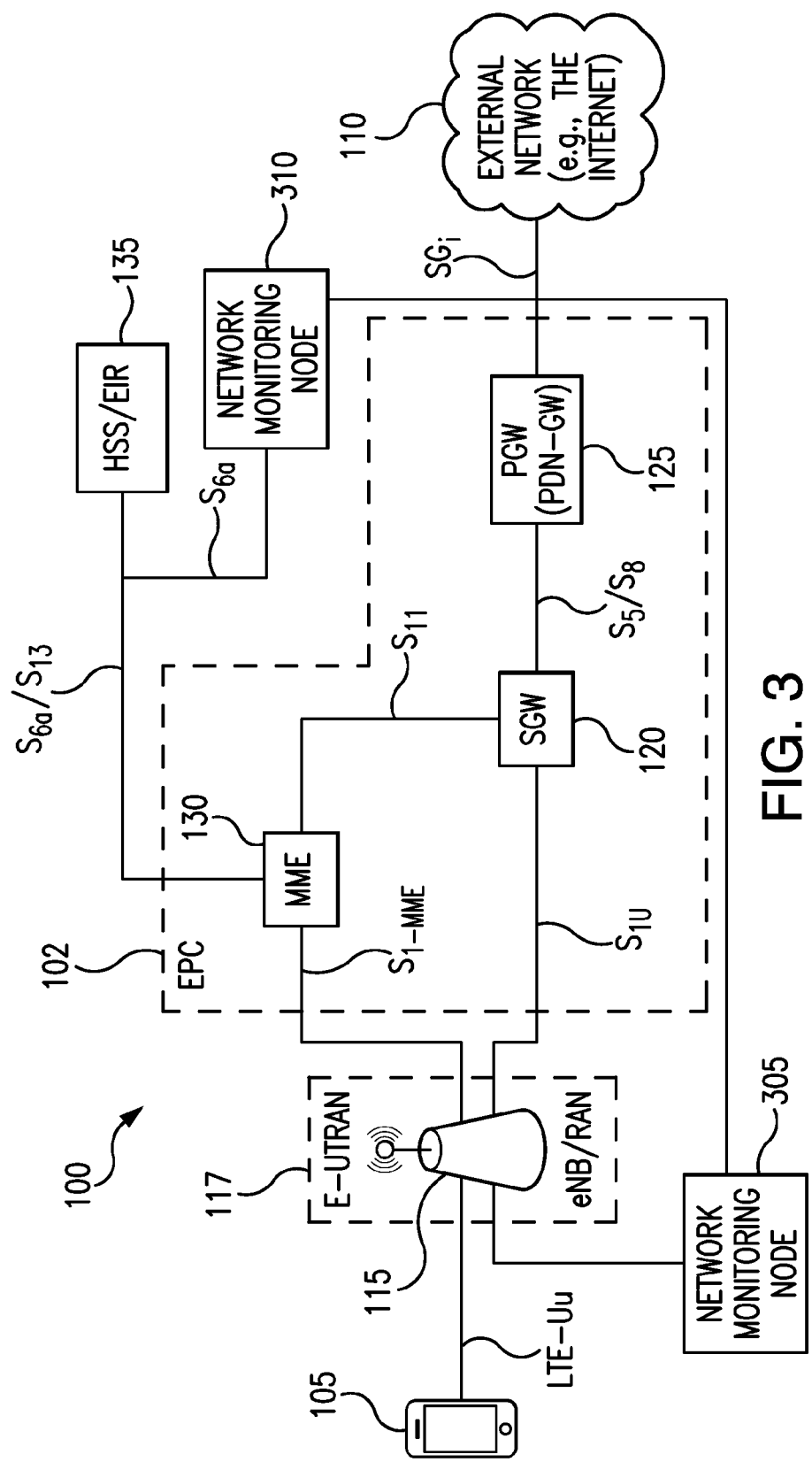
FIG. 3 illustrates portions of network 100 shown in FIG. 1, and additionally showing network monitoring nodes.

FIG. 1 is a diagram illustrating an LTE network architecture 100. The LTE network architecture 100 may be referred to as an Evolved Packet System (EPS) 100. The EPS 100 may include one or more user equipment (UE) 105, an Evolved UMTS Terrestrial Radio Access Network (E-UTRAN) 117, including one or more Evolved Node B(s) 115 (eNBs), an Evolved Packet Core (EPC) 102, a Home Subscriber Server (HSS) 135, and an External Network 110, (e.g., the Internet). As shown in FIG. 3, an S6a/S13 interface is preferably provided between HSS/EIR 135 and MME 130. It is noted that in an illustrated embodiment, the EIR functionality is expected to be built into the HSS.

EPS 100 can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

E-UTRAN 117 includes the evolved Node Bs (eNBs) 115, which provide user and control planes protocol terminations toward the UE 105. Notably, eNBs 115 may be connected to the other eNBs (not shown). ENBs 115 may also be referred to as a base station, a base transceiver station, a radio base station, a radio transceiver, a transceiver function, a basic service set (BSS), an extended service set (ESS), or some other suitable terminology. ENBs 115 provides an access point to the EPC 102 for corresponding UEs 105.

UEs 105 include, for example mobile devices, cellular phones, smart phones, session initiation protocol (SIP) phones, laptops, satellite radios, global positioning systems, multimedia devices, video devices, digital audio players (e.g., MP3 players), cameras, game consoles, or any other similar functioning device. UEs 105 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The eNBs 115 are connected to EPC 102 by an S1 interface.

EPC 102 includes Mobility Management Entities (MMEs) 130, a Serving Gateway 120, and a Packet Data Network (PDN) Gateway 125.

MME nodes 130 are generally responsible for idle mode UE paging and tagging procedure, including retransmissions. MME nodes 130 also support data bearer activation/deactivation processes and are responsible for choosing a corresponding SGW node for UE at an initial attach. MME nodes 130 also authenticate the UE, in conjunction with HSS node 135 (which contains user-related and subscription-related information). As shown, network interfaces between MME nodes 130 and eNBs include an S1-MME interface, and network interfaces between MME nodes 130 and HSS node 135 include a S6a/S13 interface. It is noted the MEID Check Request message is on the S13 interface and EIR functionality is preferably built into the MME.

SGW node 120 generally routes and forwards user data packets and performs mobility anchoring for the user plane during inter-eNodeB handovers and as an anchor for mobility between LTE and other 3GPP technologies (e.g., terminating S4 interface and relaying the traffic between 2G/3G systems and PGW). For idle state UEs, SGW node 120 terminates the downlink data path and triggers paging when downlink data arrives for the UE. SGW node 120 particularly manages and stores UE contexts (e.g. parameters of the IP bearer service, network internal routing information, etc.).

PGW node 125 generally provides connectivity from UE 105 to external packet data networks 110 and is a point of exit and entry of traffic for UE 105. Notably, PGW node 125 performs UE IP address allocation and packet filtering (e.g. deep packet inspection, packet screening) in order to map UE 105 traffic to appropriate Quality of Service (QoS) level. PGW node 120 also performs the function of a home agent for MIPv6 (Mobile IPv6) based mobility management, or the function of a Local Mobility Anchor when Proxy MIPv6 protocols are used for mobility management.

As shown, EPS 100 also includes an HSS/EIR node 135, which operates to identify, authenticate, authorize, and establish security for UE 105. HSS/EIR node 135 includes user databases for the subscription-related information (subscriber profiles), and provides information about the subscriber's location and IP information to MME node 130. Generally, UEs 105 initially register with EPC 102 using network attachment procedures before accessing network services, which causes an exchange of messages between UE 105, MME node 130 and HSS/EIR node 135.

Additionally, as shown in network 100, a Router 137 is positioned between HSS/EIR node 135 and MME nodes 130. Router 137 provides real-time routing capabilities to ensure that messages are routed among the correct elements in network 100—here, Router 137 routes messages to/from HSS/EIR node 135 and corresponding MME nodes 130. Router 137 routes these messages, using a Diameter protocol, which refers to an authentication, authorization and accounting protocol.

As noted above, the view shown in FIG. 1 is for simplicity and purposes of discussion, not limitation—any number of additional nodes/devices can be included or excluded, as appreciated by one skilled in the art.

Figure 2:
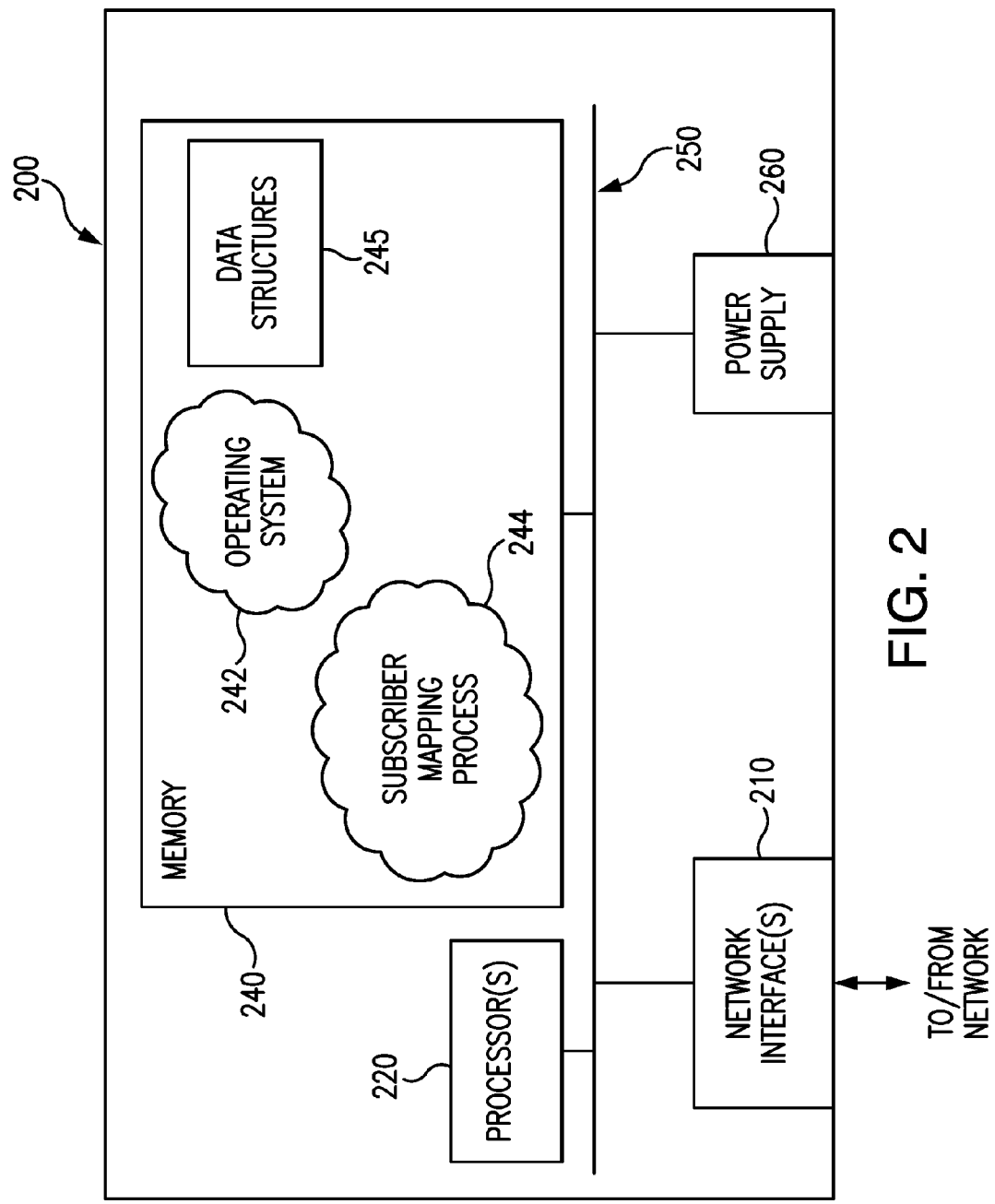
FIG. 2 illustrates an example network device/node.

FIG. 2 is a schematic block diagram of an example node/device 200 that may be used with one or more embodiments described herein, e.g., as a one of the nodes/devices shown in FIG. 1 or as a network monitoring device/node, discussed with respect to FIG. 3, below. The device 200 comprises one or more network interfaces 210, at least one processor 220, and a memory 240 interconnected by a system bus 250. Optionally, as shown, device 200 also includes a power supply 260.

Network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc.

The memory 240 comprises a plurality of storage locations that are addressable by the processor 220 and the network interfaces 210 for storing software programs and data structures (e.g., subscriber information, etc.) associated with the embodiments described herein. As noted above, certain devices may have limited memory or no memory (e.g., no memory for storage other than for programs/processes operating on the device). The processor 220 may comprise necessary elements or logic adapted to execute the software programs and manipulate data structures 245, such as addresses, routes or prefixes. An operating system 242, portions of which are typically resident in memory 240 and executed by the processor, functionally organizes the device by, inter alia, invoking operations in support of software processes and/or services executing on the device. These software processes and/or services include subscriber mapping process/services 244. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Illustratively, the techniques described herein may be performed by hardware, software, and/or firmware, such as in accordance with the subscriber mapping process 244, which may contain computer executable instructions executed by the processor 220 (or independent processor of network interfaces 210) to perform functions relating to the techniques described herein.

FIG. 3 illustrates portions of network 100 shown in FIG. 1, and additionally shows two network monitoring nodes 305 and 310 (which are shown coupled to one another since they preferably exchange information with one another). As discussed above, with reference to FIG. 2, network monitoring nodes 305 and 310 collectively execute or perform subscriber mapping process 244. Subscriber mapping process 244 correlates or maps traffic for a call within network 100 to a particular UE, without requiring vendor solicitation (e.g., vendor traffic from MME 130) and without compromising the security features used, for example, in LTE networks. Such mapping techniques may be further used in conjunction with various network analytics, device analytics, UE tracking, and the like, as is appreciated by those skilled in the art.

As discussed above, UE 105 initiates a call with eNB 115 and, during an initial attach procedure, further exchanges messages with an associated MME—here, MME 130. During the initial attach procedure, UE 105 is identified, authenticated, and one or more security contexts are established. For example, UE 105, MME 130 and HSS/EIR node 135 exchange identification and authentication messages in an Authentication and Key Agreement (AKA) process, which authenticates the UE and network to each other. In particular, the AKA process is used to negotiate various keys for ciphering or encrypting traffic between the UE 105 and the network (e.g., EPC 102), including eNB 115.

Figure 4:
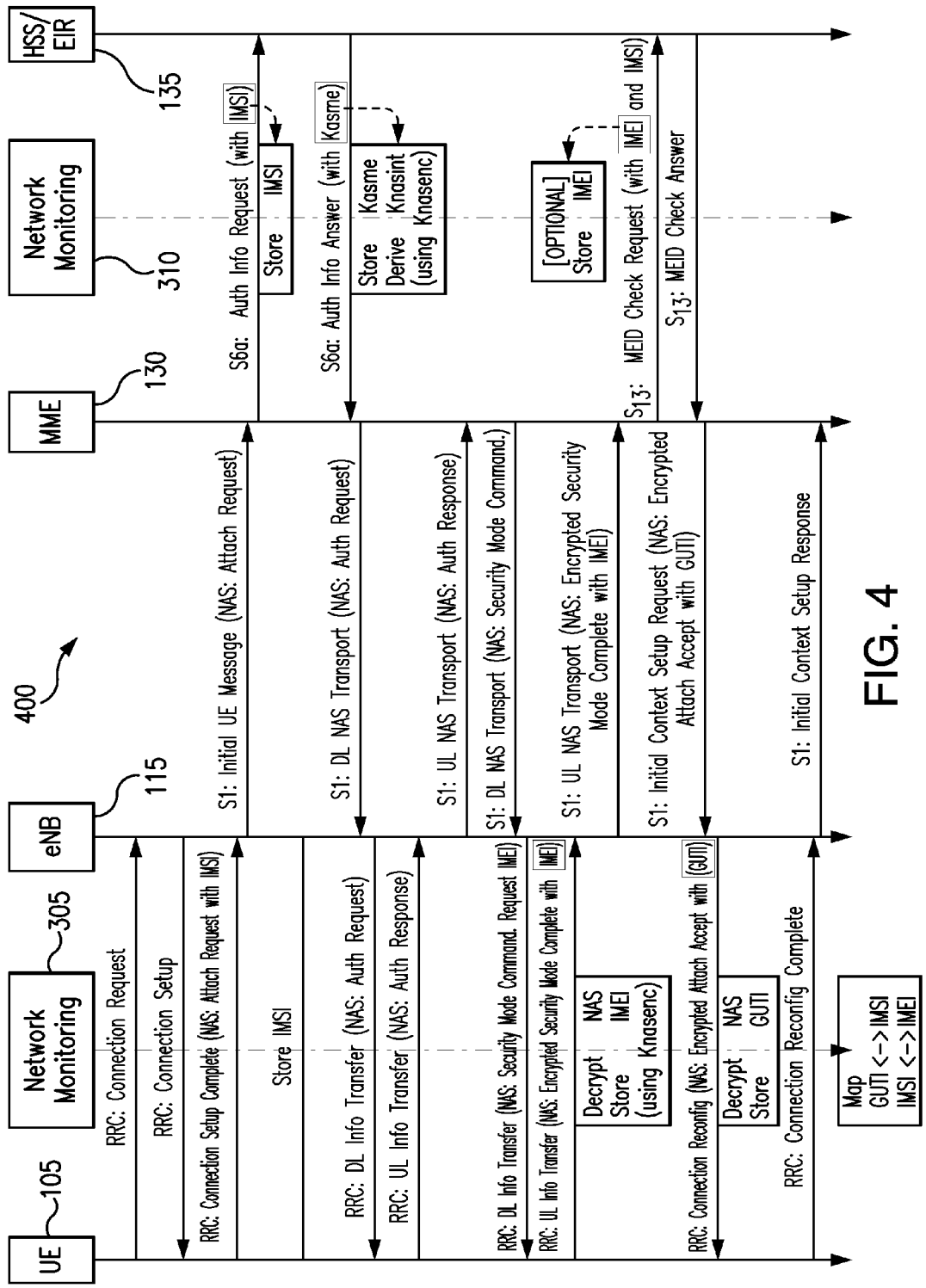
FIG. 4 illustrates a signaling diagram of an initial network attach procedure, showing relevant message exchanges between various network nodes in the communication network.

FIG. 4 illustrates a signaling diagram 400 of an initial network attach procedure, showing relevant message exchanges between various network nodes. Signaling diagram 400 also shows messages received by network monitoring nodes 305 and 310, which are used in the subscriber mapping process 244. Generally, network monitoring nodes 305 and 310 receive messages send during a network attach process from corresponding network interfaces, analyze the messages, determine one or more encryption keys, derive UE identifiers using, in part, the encryption keys, and generate comprehensive UE mappings. Such comprehensive UE mappings provide user identifiers, including International Mobile Subscriber Identification (IMSI), and equipment identifiers, such as International Mobile Equipment Identification (IMEI), for subsequent network calls or connectivity sessions. In turn, these user identifiers facilitate data correlation amongst various network nodes, UE tracking, and overall network analytics (e.g., for generating Quality-of-Experience (QoE), Key Quality Indicators (KQIs), and/or Key Performance Indicators (KPIs), etc.).

In detail, UE 105 initially registers with EPC 102 to access network resources using the network attach procedure, shown (in part) by signaling diagram 400. UE 105 initiates a NAS attach procedure over the Uu air interface to eNB 115 using the Radio Resource Control (RRC) protocol. Typically, the NAS: Attach Request messages (including inter alia International Mobile Subscriber Identity (IMSI) or an old Globally Unique Temporary Identity (GUTI) if available) together with various RRC parameters (e.g., selected network(s), old Globally Unique MME Identities (GUMMEIs), etc.). As shown, the attach request messages includes the IMSI associated with UE 105—"NAS: Attach Request with IMSI".

The eNB 115 forwards the UE's NAS: Attach Request message to MME node 130 in an S1-MME control message over the S1 network interface. Notably, if UE 105 is unknown in both the prior MME node/SGSN node (not shown) and the "new" MME node 130, MME node 130 sends a NAS: Identity Request to UE 105, which causes UE 105 to forward its IMSI in the NAS: Identity Response message.

As shown, MME node 130 receives the forwarded UE NAS: Attach Request from eNB 115, and, since this is an initial attach (e.g., there is no UE context in network 100), MME node 130 begins the Authentication and Key Agreement (AKA) process and a NAS security process with HSS 135. The AKA and NAS security processes activate integrity protection and NAS ciphering for subsequent traffic messages. During the AKA process and NAS security process, an "S6a: Auth Info Request" message and "S6a: Auth Info Answer" message are exchanged between MME 130 and HSS 135. Notably, for ciphering or encryption for subsequent traffic, HSS node 135 generates a base-key called a $K_{asme}$ key, which is used to derive a $K_{NASenc}$ key (for NAS protocol encryption in subsequent messages between UE 105 and MME 130), and a $K_{NASint}$ key (for integrity protection). After the exchange between MME node 130 and HSS node 135, MME node exchanges Authentication messages with UE 105, via eNB 115.

During the message exchange for the initial attach procedure, network monitoring node 310 receives the AKA and NAS security setup messages from one or more network tap points in network interface S6a, and determines the IMSI associated with UE 105 and the $K_{asme}$ key from the "S6a: Auth Info Request" message and "S6a: Auth Info Answer" message, respectively. Network monitoring node 310 further derives the $K_{NASenc}$ key and the $K_{NASint}$ key from the $K_{asme}$ key (e.g., according to TS 33.220, using HMAC SHA256 algorithm). Notably, in preferred embodiments, the $K_{asme}$ key, including the $K_{NASenc}$ key and the $K_{NASint}$ key are also mapped for UE 105.

As a result of the AKA procedure, MME node 130 further establishes an EPS Security Context, using a NAS Security control procedure, and exchanges security mode messages with UE 105. As shown, MME node 130 sends a S1: DL NAS Transport ((NAS: Security Mode Command) message to eNB 115, which forwards the message to UE 105. In response, UE 105 sends a NAS: Security Mode Complete message—RRC: UL Info Transfer (NAS: Security Mode Complete with IMEI) to eNB 115. The NAS: Security Mode Complete message is tunneled in the RRC protocol and encrypted according to the $K_{NASenc}$ key.

Network monitoring node 305 monitors this exchange of security mode messages between UE 105 and eNB 115 and receives the NAS: Security Mode Complete message. Network monitoring node 305 decrypts the NAS: Security Mode Complete message using the derived $K_{NASenc}$ key (e.g., from network monitoring node 310). In this fashion, network monitoring nodes 305 and 310, collectively, determine the subscriber identification—here, IMEI—and the equipment identification—IMEI—for UE 105, without requiring an MME node feed. Such identification are stored and mapped for each UE in one or both of network monitoring nodes (or even in a larger network monitoring system (not shown)). In certain alternative embodiments, the IMEI can also be determined by network monitoring node 310, when the S13: MEID Check Request (with IMEI and IMSI) message is sent from MME 130 to HSS 135.

Once the identification, authorization, and security context is established (and if all checks are successful), MME node 130 constructs a context for the UE 105. MME 130 sends a NAS: Attach Accept message to eNB 115 in the "S1: Initial Context Setup Request". Importantly, the NAS: Attach Accept message includes a Globally Unique Temporary ID (GUTI) assigned to UE 105 as a security measure to avoid transmitting other identifiers for UE 105 (e.g., IMSI, IMEI, etc.) over the air frequently. Additionally, the S1: Initial Context Setup Request messages include various other context parameters to enable UE 105 access to network resources from EPC network 102.

The eNB 115 forwards the S1: Initial Context Setup Request message as an "RRC: Connection Reconfig (NAS: Encrypted Attach Accept with GUTI)" to UE 105. UE 105 receives the message, stores the GUTI and the context parameters, and sends an "RRC: Connection Reconfig Complete" message to the eNB 115, which results in an S1: Initial Context Setup Response to MME 130.

Network monitoring node 305 also monitors the exchange messages, and receives the RRC: Connection Reconfig message, which includes the encrypted NAS: Attach Accept with GUTI for UE 105. Network monitoring node 305 decrypts the NAS: Attach Accept message using the derived $K_{NASenc}$ key (e.g., from network monitoring node 310) to obtain the GUTI assigned to the UE. Collectively, network monitoring nodes 305 and 310 further map the GUTI for the UE to the subscriber identification and equipment identification and store such mapping for subsequent network analytics, UE tracking, and the like. With regards to FIGS. 4 and 5, it is to be understood and appreciated the Network Monitoring Node column may also be on the S1 interface (between eNB and MME) since network monitoring may also occur on the RRC or S1 interface (both the RRC and S1 interfaces tunnel the same NAS messages of interest).

Figure 5:
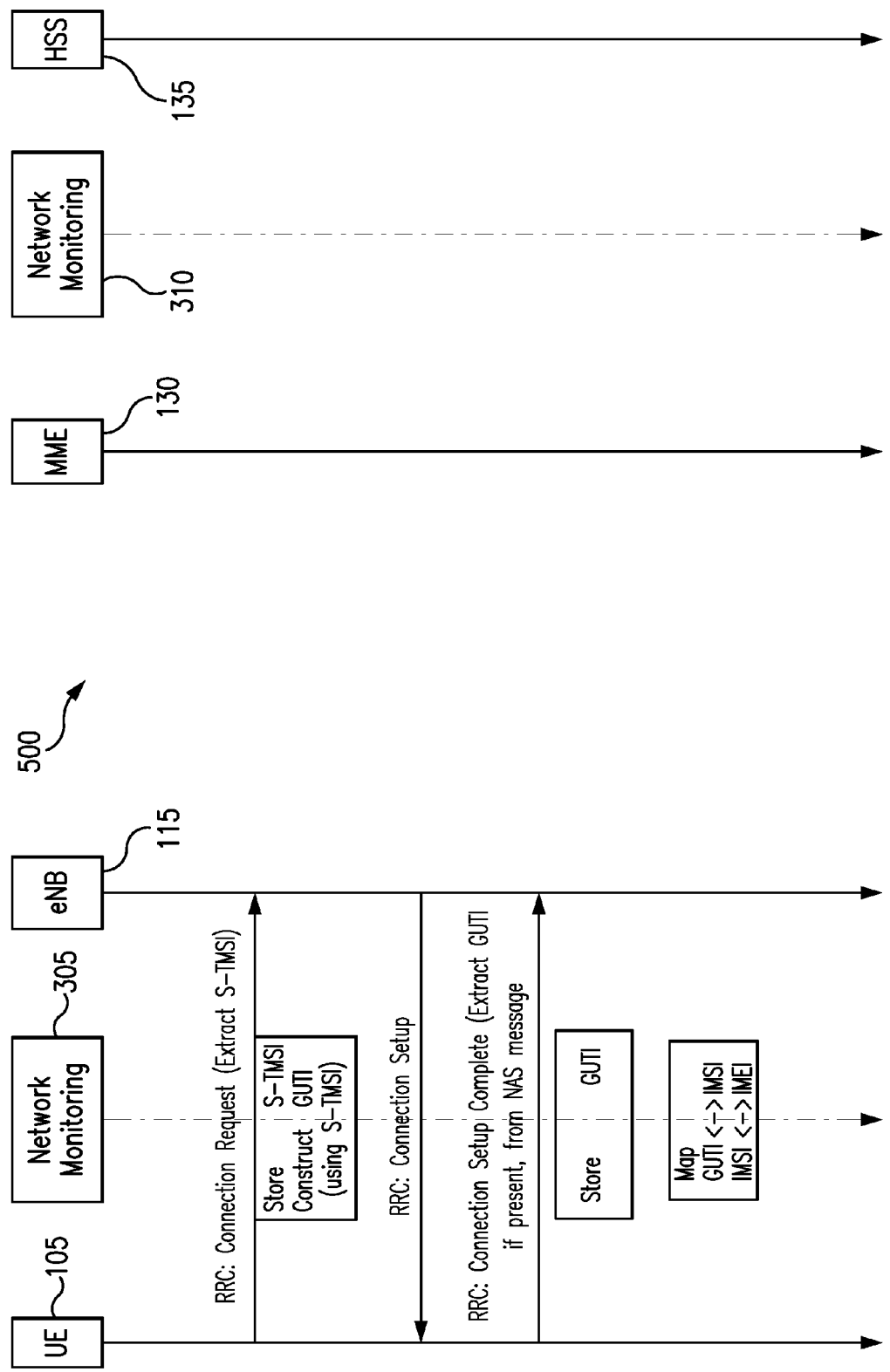
FIG. 5 illustrates a signaling diagram for mapping subscribers during subsequent calls or sessions.

FIG. 5 illustrates a signaling diagram 500 for mapping subscribers during subsequent calls or sessions. As shown in diagram 500, a UE initiates an RRC:Connection Request with a corresponding eNB and provides S-TMSI identification. Notably, the UE identification is provided in two messages—the RRC: Connection Request (containing S-TMSI) and possibly as part of the NAS message (containing GUTI) within the RRC: Connection Setup Complete, each of which may be monitored/received by network monitoring node 305. Network monitoring node 305 receives the RRC: Connection Request, extracts the S-TMSI, and constructs the GUTI from the extracted S-TMSI, or uses the GUTI from the NAS message in RRC: Connection Setup Complete if present. Based on prior mapping (see FIG. 4), the network monitoring node further determines the IMSI and IMEI, based on the GUTI. In this fashion, messages (including NAS messages) for the GUTI are also assigned to IMSI/IMEI for UE 105 for the call. Moreover, if a new GUTI is assigned to the IMSI, or if any security Keys are changed (e.g., due to re-authentication, security mode changes, etc.), network monitoring node further updates its mapping for the subscriber, as appropriate. It is noted that all the NAS messages are preferably monitored for a UE to keep track of the overall count of NAS messages exchanged. Preferably, this NAS Counter is one of the inputs needed for Decryption along with the security Keys.

As discussed above, a GUTI is a unique temporary identifier assigned to UE 105 to avoid sensitive subscriber information from being continuously transmitted. Once assigned, UE 105 uses the GUTI until a new GUTI is assigned (e.g., by a corresponding MME node). GUTIs include two parts—the globally unique Globally Unique Mobility Management Entity Identifier (GUMMEI), which identifies the network, and an M-TMSI, which identifies the device. For radio communication, the GUTI can be shortened into an S-TMSI form, which includes the M-TMSI and a portion of the GUMMEI.

Figure 6A:
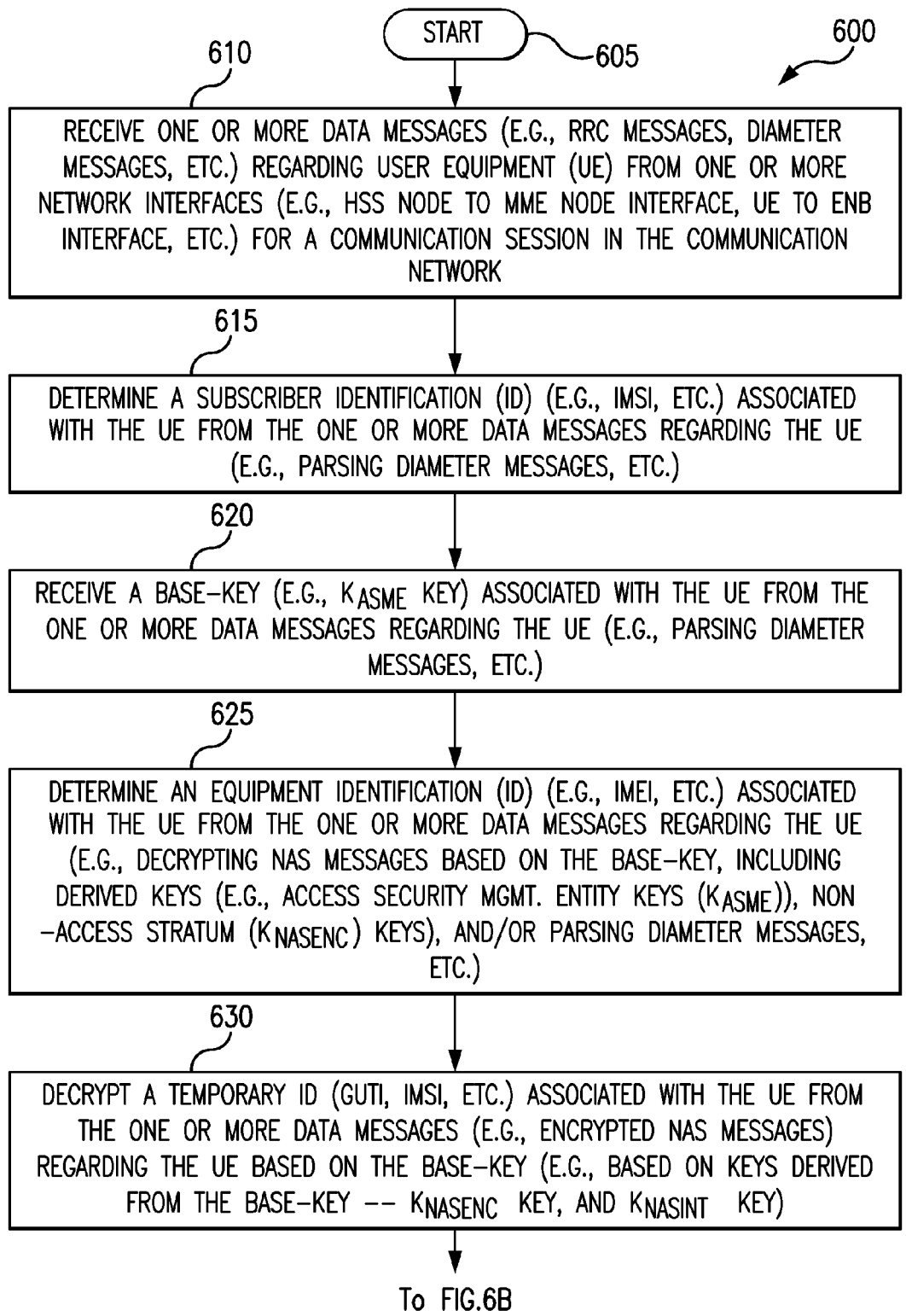
FIG. 6A and FIG. 6B illustrate an example simplified procedure for improved subscriber mapping in a communication network, particularly from the perspective of a network monitoring node or device.
Figure 6B:
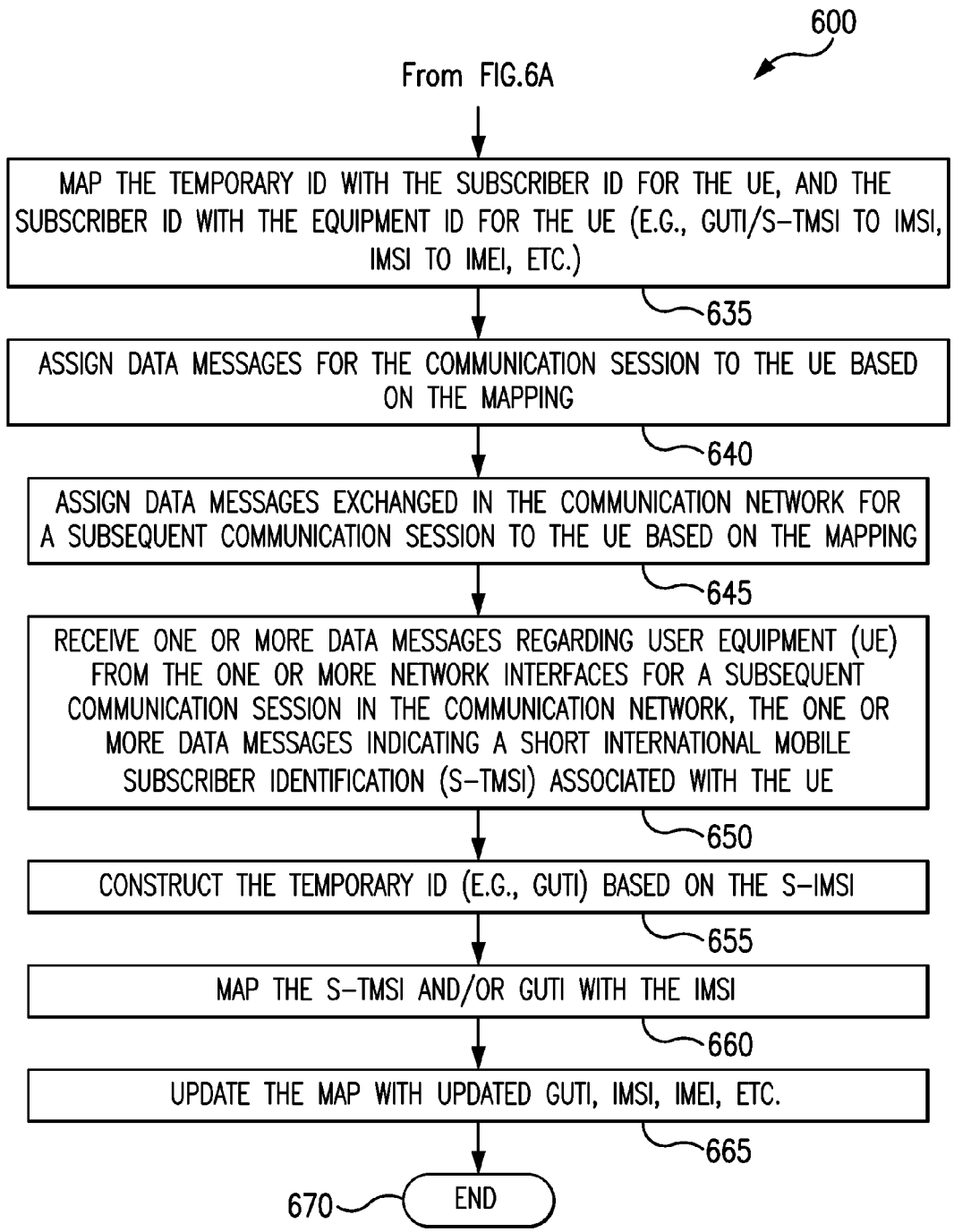

FIGS. 6A-6B illustrate an example simplified procedure 600 for the improved subscriber mapping, particularly from the perspective of a network monitoring node, in accordance with one or more embodiments described herein.

FIG. 6A begins at step 605 and continues to step 610 where, as discussed above, the network monitoring node (or nodes) receives one or more data messages regarding User Equipment (UE) from one or more network interfaces for a communication session in a communication network. For example, as discussed above, one or more network monitoring nodes (i.e., network monitoring nodes 305 and 310) are employed in the communication network 100 to receive data messages at corresponding network taps between, for example, UE 105 and eNB 115 (e.g., Radio Resource Control messages), and between MME node 130 and HSS node 135 (e.g., Diameter messages). Further, as is appreciated by those skilled in the art, network monitoring nodes 305 and 310 may form part of a single larger network monitoring node or network monitoring system.

Procedure 600 continues to step 615 where the network monitoring node determines a subscriber identification (ID) associated with the UE from the one or more data messages regarding the UE. In particular, the subscriber ID includes, for example, an International Mobile Subscriber Identification (IMSI). Further, the network monitoring node can determine the subscriber ID by filtering and parsing Diameter messages between HSS node 135 and MME node 130.

The network monitoring node further receives a base-key or a security key (e.g., $K_{asme}$ key) as in step 620. As discussed above, this base-key serves as a security key for subsequent message exchanges between UE 105 and EPC network 102. The network monitoring node uses the base-key to further derive a Non-Access Stratum Encryption ($K_{NASenc}$) Key and a Non-Access Stratum Integrity Protection ($K_{NASint}$) Key, as discussed above.

The network monitoring node also determines, in step 625, an equipment identification (ID) associated with the UE from the one or more data messages. For example, the equipment ID can include an International Mobile Equipment Identifier (IMEI). During initial attach procedures, discussed above; the network monitoring node receives encrypted NAS messages within RRC messages (e.g., "RRC: UL Info Transfer: NAS: Security Mode Complete with IMEI") and decrypts the NAS messages based on the base-key (or derived keys) to determine the IMEI. Alternatively, in certain embodiments, the network monitoring node can determine the equipment ID associated with the UE from Diameter messages on the S13 interface between the MME node and the HSS node (e.g., "S13: MEID Check Request (with IMEI and IMSI)").

Additionally, during initial attach procedures, the UE and eNB exchange RRC messages containing NAS messages that include an encrypted temporary ID for the UE (assigned by MME 130). The network monitoring node receives this exchange and decrypts, in step 630, the temporary ID (GUTI, S-TMSI (for subsequent call sessions), etc.) associated with the UE based on keys derived from the base-key—$K_{NASenc}$ key, and $K_{NASint}$ key.

The network monitoring node maps, in step 635, the temporary ID with the subscriber ID for the UE, and further maps the subscriber ID with the equipment ID for the UE. In this fashion, the network monitoring node maps the GUTI (or S-TMSI) to the IMSI and the IMSI to IMEI. Data messages for the communication session are further assigned, in step 640, to the UE based on the mapping, and data messages for subsequent communication sessions for the UE are also assigned, in step 645, to the UE based on the mapping (e.g., based on the GUTI).

Network analytics performed on the assigned data messages include significant network penetration since messages are mapped for a UE throughout the EPC network and the E-UTRAN network, as well as provide increased UE tracking.

For the subsequent communication sessions, the UE attaches to the network using the temporary ID—here, the GUTI. As discussed above, a short form of the GUTI is typically used for radio network (e.g., S-TMSI) communications. The network monitoring node receives data messages for this subsequent attach, including the S-TMSI (step 650) and constructs (step 655) the GUTI from the S-TMSI associated with the UE. The network monitoring node additionally maps the S-TMSI and/or GUTI with the IMSI for the UE (step 660) and continuously updates the mapping (step 665) when network events update UE identification (e.g., changes to security, integrity, certain handover procedures, and the like).

Procedure subsequently ends in step 670, but may begin again at step 610 where the network monitoring node receives data messages regarding UE or a communication session.

It should be noted that while certain steps within procedures 600 may be optional as described above, the steps shown in FIG. 6A-6B are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for improved subscriber mapping in a communication network. In particular, the techniques herein significantly obtain user identifiers (e.g., IMSI, IMEI, and GUTI) from two different network interfaces and correlate or map such information with a particular UE. Moreover, the improved subscriber mapping techniques also obtain encryption keys for the UE, which enables the network monitoring node(s) to decrypt temporary IDs. Using this mapping, network data can be correlated with particular UEs, devices, and subscribers, to provide significant network penetration, improved UE tracking, and facilitate network analytics.

While there have been shown and described illustrative embodiments that provide for network monitoring at specific interfaces and for a specific network (e.g., an LTE 3GPP network), it is to be understood that various other adaptations and modifications may be made within the spirit and scope of the embodiments herein. For example, the embodiments in their broader sense are not as limited, and may, in fact, be used with other types of networks and/or protocols. In addition, while certain protocols are shown, other suitable protocols may be used, accordingly. Also, while the techniques generally describe initiation and determinations by two network monitoring nodes, a single network node and/or additional network monitoring nodes can be employed to provide the same functionality described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for subscriber mapping in a communication network in real time continuously, comprising:
   receiving, by a network monitoring node(s), one or more data messages regarding User Equipment (UE) from one or more network interfaces for a communication session in the communication network;
   determining, by the network monitoring node, a subscriber identification (ID) associated with the UE from the one or more data messages regarding the UE;
   determining, by the network monitoring node, an equipment identification (ID) associated with the UE from the one or more data messages regarding the UE;
   receiving, by the network monitoring node, a base-key associated with the UE from the one or more data messages regarding the UE;
   deriving, by the network monitoring node, a Non-Access Stratum Encryption ($K_{NASenc}$) Key and a Non-Access Stratum Integrity Protection ($K_{NASint}$) Key;
   decrypting, by the network monitoring node, a temporary ID associated with the UE from the one or more data messages regarding the UE based on both the $K_{NASenc}$ and $K_{NASint}$ Keys;
   mapping, by the network monitoring node, the temporary ID with the subscriber ID for the UE, and the subscriber ID with the equipment ID for the UE;
   assigning, by the network monitoring node, data messages for the communication session to the UE based on the mapping; and
   assigning, by the network monitoring node, the subscriber ID and the equipment ID to further communication sessions associated with the UE.

2. The method of claim 1,
   wherein the one or more network interfaces comprises two network interfaces,
   wherein determining the subscriber ID associated with the UE further comprises determining the subscriber ID associated with the UE from the one or more data messages regarding the UE from a first network interface;
   wherein determining the equipment ID associated with the UE further comprises determining an encrypted equipment ID associated with the UE from the one or more data messages regarding the UE from a second network interface and decrypting the equipment ID associated with the UE based on the base-key such that a mapping of International Mobile Subscriber Identity (IMSI) to International Mobile Equipment Identity (IMEI) is created using messages from at least one of the first and second network interfaces; and
   wherein an S1AP interface can replace a Radio Resource Control RRC interface when both the S1AP and RRC interfaces tunnel through interested NAS messages.

3. The method of claim 1, further comprising: assigning, by the network monitoring node, data messages exchanged in the communication network for a subsequent communication session to the UE based on the mapping and wherein functionality of an Equipment Identity Register (EIR) node is integrated with a Home Subscriber Service (HSS) node.

4. The method of claim 1, further comprising:
   deriving, by the network monitoring node, at least one decryption key from the base-key, and
   wherein, decrypting the temporary ID associated with the UE further comprises decrypting the temporary ID associated with the UE from the one or more data messages regarding the UE based on the at least one decryption key.

5. The method of claim 4, wherein the decryption key includes at least one of a Non-Access Stratum Encryption Key ($K_{NASenc}$) and a Non-Access Stratum Integrity Protection Key ($K_{NASint}$).

6. The method of claim 1, wherein the temporary ID is a Globally Unique Temporary ID (GUTI).

7. The method of claim 1, wherein the subscriber ID is an International Mobile Subscriber Identity (IMSI), and the equipment ID is an International Mobile Equipment Identity (IMEI).

8. The method of claim 1, wherein the one or more data messages received from the one or more network interfaces include Diameter messages exchanged on a network interface disposed between a Home Subscriber Server (HSS) node and a Mobile Management Entity (MME) node.

9. The method of claim 8, wherein the network interface disposed between the HSS node and the MME node is a first network interface, wherein the Diameter messages are exchanged on a first network interface between the HSS node and the MME node, and wherein determining the equipment ID associated with the UE comprises determining the equipment ID associated with the UE from one or more Radio Resource Control (RRC) messages exchanged on a second network interface disposed between the UE and one or more evolved Node Bs (eNBs) wherein a mapping is created of IMSI to IMEI using at least one of the first and second network interfaces.

10. The method of claim 1, wherein the temporary ID is a Globally Unique Mobility Management Entity Identifier (GUTI), the method further comprising:
    receiving, by the network monitoring node, one or more data messages regarding User Equipment (UE) from the one or more network interfaces for a subsequent communication session in the communication network, the one or more data messages indicating a Shortened Temporary Mobile Subscriber Identification (T-IMSI) associated with the UE; and
    constructing, by the network monitoring node, the GUTI based on the S-TMSI, and
    wherein mapping the temporary ID with the subscriber ID for the UE comprises mapping at least one of the S-TMSI and the GUTI with the IMSI.

11. The method of claim 1, further comprising:

determining, by the network monitoring node, an updated temporary ID associated with the UE issued for the UE from one or more data messages regarding the UE from the one or more network interfaces; and wherein mapping the temporary ID with the subscriber ID for the UE further comprises mapping the updated temporary ID with the subscriber ID for the UE.

12. A network monitoring apparatus, comprising:

one or more network tap interfaces adapted to receive messages exchanged between nodes in a communication network;

a processor adapted to execute one or more processes; and a memory configured to store a process executable by the processor, the process when executed operable to:

receive one or more data messages regarding User Equipment (UE) from one or more network interfaces for a communication session in the communication network;

determine a subscriber identification (ID) associated with the UE from the one or more data messages regarding the UE;

determine an equipment identification (ID) associated with the UE from the one or more data messages regarding the UE;

receive a base-key associated with the UE from the one or more data messages regarding the UE;

deriving, by the network monitoring node, a Non-Access Stratum Encryption ($K_{NASenc}$) Key and a Non-Access Stratum Integrity Protection ($K_{NASint}$) Key;

decrypt a temporary ID associated with the UE from the one or more data messages regarding the UE based on both the $K_{NASenc}$ and $K_{NASint}$ Keys;

map the temporary ID with the subscriber ID for the UE, and the subscriber ID with the equipment ID for the UE; and assign data messages for the communication session to the UE based on the mapping.

13. The network monitoring apparatus of claim 12, wherein the one or more network interfaces comprises two network interfaces, wherein the process to determine the subscriber ID associated with the UE is further operable to determine the subscriber ID associated with the UE from the one or more data messages regarding the UE from a first network interface, and wherein the process to determine the equipment ID associated with the UE is further operable to determine an encrypted equipment ID associated with the UE from the one or more data messages regarding the UE from a second network interface and decrypt the equipment ID associated with the UE based on the base-key wherein a mapping is created of IMSI to IMEI using at least one of the first and second network interfaces.

14. The network monitoring apparatus of claim 12, wherein the process, when executed by the processor is further operable to: assign data messages exchanged in the communication network for a subsequent communication session to the UE based on the mapping.

15. The network monitoring apparatus of claim 12, wherein the process, when executed by the processor is further operable to:

derive at least one decryption key from the base-key, and wherein, the process to decrypt the temporary ID associated with the UE is further operable to decrypt the temporary ID associated with the UE from the one or more data messages regarding the UE based on the at least one decryption key.

16. The network monitoring apparatus of claim 12, wherein the temporary ID is a Globally Unique Temporary ID (GUTI).

17. The network monitoring apparatus of claim 12, wherein the subscriber ID is an International Mobile Subscriber Identity (IMSI), and the equipment ID is an International Mobile Equipment Identity (IMEI).

18. The network monitoring apparatus of claim 12, wherein the one or more data messages received from the one or more network interfaces include Diameter messages exchanged on a first network interface disposed between a Home Subscriber Server (HSS) node and a Mobile Management Entity (MME) node and Radio Resource Control (RRC) messages exchanged on a second network interface disposed between the UE and one or more evolved Node Bs (eNBs).

* * * * *